United States Patent [19]

Foster

[11] 4,013,987

[45] Mar. 22, 1977

[54] MICA TAPE BINDER

[75] Inventor: Newton C. Foster, Pittsburgh, Pa.

[73] Assignee: Westinghouse Electric Corporation, Pittsburgh, Pa.

[22] Filed: Aug. 22, 1975

[21] Appl. No.: 607,007

[52] U.S. Cl. .......................... 336/206; 174/120 SR; 252/431 C; 310/208; 260/2 EC; 260/830 TW; 428/324; 428/363; 428/413; 428/417; 428/418; 428/454

[51] Int. Cl.[2] .................... H01F 27/32; B32B 19/00

[58] Field of Search .......... 428/324, 363, 454, 417, 428/413, 418; 252/431 C; 310/208; 336/206; 174/120 SR; 260/2 EC, 830 TW, 37 EP

[56] References Cited

UNITED STATES PATENTS

| | | | |
|---|---|---|---|
| 3,172,921 | 3/1965 | Flowers | 428/413 |
| 3,254,150 | 5/1966 | Rogers | 428/324 |
| 3,458,389 | 7/1969 | Mertens | 428/324 |
| 3,556,925 | 1/1971 | Mertens | 428/149 |
| 3,560,320 | 2/1971 | Letteron | 428/363 |
| 3,759,734 | 9/1973 | Mendelsohn | 428/413 |

FOREIGN PATENTS OR APPLICATIONS

| | | | |
|---|---|---|---|
| 751,054 | 1/1967 | Canada | 428/324 |

*Primary Examiner*—George F. Lesmes
*Assistant Examiner*—Ellis P. Robinson
*Attorney, Agent, or Firm*—D. P. Cillo

[57] ABSTRACT

A flexible, non-tacky tape, for electrical conductors used in high voltage devices, comprises at least one layer of a micaceous material impregnated with a resinous admixture consisting essentially of epoxy resin and zinc 2-ethyl hexonate as a latent catalyst.

10 Claims, 3 Drawing Figures

MICA TAPE BINDER

BACKGROUND OF THE INVENTION

This invention relates to producing mica tape insulation for high voltage coils of motors, generators or other electric machines. The mica tape is generally bound together by a catalyzed epoxy resinous adhesive. The catalyst is needed to promote the polymerization of the epoxy resin to a thermoset state.

The resinous adhesive in the mica tape must not gel during months of storage at room temperature. If the adhesive were to gel, air pockets would be sealed by insulating varnish which may be vacuum impregnated into the tape in a subsequent step, resulting in lower electric strength and lower corona starting levels. The mica tape adhesive must, in addition, withstand coil drying for several hours at 100° C without curing.

When the adhesive is used to fully load the tape, so that subsequent impregnation with an insulating varnish is not necessary, even a slight amount of cure will make the tape too stiff to handle or wrap around a coil. The adhesive must polymerize to a thermoset state only upon final curing of the mica tape wound coil. In addition to good shelf life, the adhesive must provide good electrical properties, thermal stability, moisture resistance, pliability, and adherability without tackiness.

Heretofore, numerous catalysts have been used for mica tape epoxy resin adhesives, including, polyamines, anhydrides, polybasic acids, borate-titanates and aminepolyborate esters, as taught by Rogers in U.S. Pat. No. 3,254,150, and salts of octonic acid such as zinc octolate, as taught by Mertens in U.S. Pat. No. 3,556,925. Only boron trifluoride-amine complexes have been combined with epoxy resins to provide a mica tape adhesive that will not start to gel during storage, and that will cure only during the final high temperature bake. However, the boron trifluoride-amine catalyst may increase the power factor of the mica insulation to over 40% at the operating temperature of the electrical machine, generally about 150° C. This high power factor limits the use of these adhesives in high voltage insulation i.e. over 7,500 volts, and presents some commercial problems when it is used in even lower voltage apparatus.

There is a need then for an improved epoxycatalyst adhesive system, for use in mica tape insulation for conductors and for coils in electrical machines. This adhesive should have superior electrical properties so that it can be used for the dual purpose of sole insulating resin, as well as adhesive binder, in a preimpregnated mica tape; or solely as a binder in a mica tape that is to be subsequently impregnated with, for example, a polyester, epoxy or styrene-epoxy solventless varnish.

SUMMARY OF THE INVENTION

Generally, this invention relates to a composition of matter, comprising a mica tape formed from at least one layer of a micaceous material such as flakes of mica, mica paper, or the like, which may be supported by a pliable fibrous sheet backing, and impregnated with an admixture of ingredients including (1) at least one viscous liquid epoxy resin having reactive epoxy groups and an epoxy equivalent weight of from about 170 to 300 and (2) zinc 2-ethyl hexonate as a latent catalyst.

The mica tape may be fully loaded with the epoxy adhesive composition to form a flexible, non-tacky preimpregnated tape i.e. the adhesive will provide about 20 to 35 wt.% of the bound mica tape weight. In this case, the epoxy resin must be capable of forming an infusible thermoset insulation under suitable curing conditions. The epoxy composition can also be used solely as an adhesive, where the unimpregnated tape may contain only about 3 wt.% to 15 wt.% of the adhesive. In this case, a solventless insulating varnish may subsequently be impregnated into the tape.

Where the tape is to be fully loaded, a mixture of preheated epoxy resins must be used; one having an epoxy equivalent weight of from about 170 to 210, and the other having an epoxy equivalent weight of from about 215 to 300. When the epoxy composition is to be used solely as an adhesive, the epoxy resin must have an epoxy equivalent weight of from about 215 to 300. In both cases, the resulting bound mica tape is applicable to electrical machine windings.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
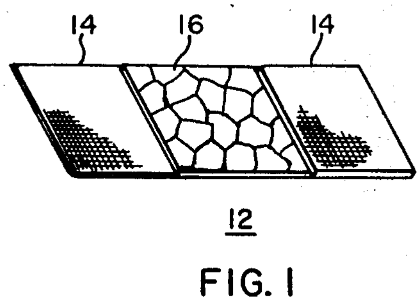
FIG. 1 is a fragmentary view in perspective of a tape having mica flakes disposed between backing members and impregnated with the binding adhesive of this invention.

The epoxy resins which are preferably employed in the invention are obtainable by reacting epichlorhydrin with a dihydric phenol in an alkaline medium at about 50° C, using 1 to 2 or more moles of epichlorhydrin per mole of dihydric phenol. The heating is continued for several hours to effect the reaction, and the product is then washed free of salt and base. The product, instead of being a single, simple, compound, is generally a complex mixture of glycidyl polyethers, but the principal product may be represented by the structural chemical formula:

$$\overbrace{CH_2-CH}^{O}-CH_2-O\left(R-O-CH_2-CHOH-CH_2-O\right)_n R-O-CH_2-\overbrace{CH-CH_2}^{O},$$

wherein $n$ is an integer of the series 0, 1, 2, 3 . . . , and R represents the divalent hydrocarbon radical of the dihydric phenol.

The glycidyl polyethers of a dihydric phenol used in the invention have a 1, 2 epoxy equivalency between 1.0 and 2.0 i.e. at least one 1, 2 epoxy group. By the epoxy equivalency, reference is made to the average number of 1, 2 epoxy groups,

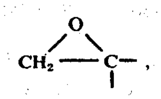

contained in the average molecule of the glycidyl ether.

Preferably in the formula above, R is:

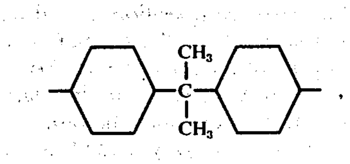

and these glycidyl polyethers are commonly called bisphenol A type epoxy resins. Bisphenol A (*p*, *p* - dihydroxy-diphenyldimethyl methane) is the dihydric phenol used in these epoxides.

The epoxy resins may be characterized by reference to their epoxy equivalent weight, which is the mean molecular weight of the particular resin divided by the mean number of epoxy units per molecule. In the present invention, the suitable epoxy resins are characterized by an epoxy equivalent weight of from about 170 to 300.

Typical epoxy resins of bisphenol A are readily available in commercial quantities, and reference may be made to the *Handbook of Epoxy Resins* by Lee and Neville for a complete description of their synthesis, or to U.S. Pat. Nos. 2,324,483; 2,444,333; 2,500,600; 2,511,913; 2,558,949; 2,582,985; 2,615,007; and 2,633,458.

When the epoxy resin is to be used for a non-tacky preimpregnated tape i.e. a fully loaded tape where the epoxy resin adhesive will provide about 20 wt. % to 35 wt.% of the bound, resin loaded mica tape weight; a mixture of two preheated epoxy resins is used. The mixture will contain about 45 to 55 parts by weight of an epoxy resin having an epoxy equivalent weight of between about 170 to 210, and about 45 to 55 parts by weight of an epoxy resin having an epoxy equivalent weight of between about 215 to 300. Preferably, the mixture will be on a 1:1 weight basis. In this preferred preimpregnation embodiment, the epoxy-catalyst resin will also serve the function of sole resinous insulation.

For fully loaded, preimpregnation tape applications, if epoxy resins are used only within the epoxy equivalent weight range of about 170 to 210, the tape will be very tacky and may block or solidify on the roll during storage. If epoxy resins are used only within the epoxy equivalent weight range of about 215 to 300, the tape will be very stiff and unsuitable for coil winding.

When the epoxy resin is to be used solely as an adhesive in an unimpregnated tape i.e. the tape will contain only about 3 wt.% to 15 wt.% of the adhesive, a single epoxy resin can be used within the epoxy equivalent weight range of about 215 to 300. Here there is no need for a dual epoxy resin system or of a preheating step, but if epoxy resins are used having an epoxy equivalent weight of below about 215, the composition will not be adhesive or thick enough to bind the tape effectively.

In all cases, only zinc 2-ethyl hexonate is used as a catalyst to polymerize the adhesive to a thermoset state. This material provides the epoxy adhesive with excellent shelf i.e. the ability to remain only partly reacted and not to begin to gel at 25° C for over about 3 months. It also allows the tape to withstand coil drying without curing, yet will provide excellent epoxide cure at final baking temperatures in the range of about 140° C to 225° C. This material also provides excellent thermal stability and superior electrical properties, allowing the tape to be used on high voltage apparatus. The zinc 2-ethyl hexonate appears to have latent catalytic activity i.e. the ability to speed up curing rates at elevated temperatures of over about 140° C while exhibiting little cure at room temperature, thus providing good storage properties.

The zinc 2-ethyl hexonate is prepared by stirring together stoichiometric quantities of zinc oxide and 2-ethyl hexoic acid, i.e. 81.4 parts and 288.4 parts by weight respectively, while heating at 100° C to 110° C. The water formed during the reaction is boiled away. After about 30 minutes, boiling ceases and the clear viscous product, zinc 2-ethyl hexonate, results.

From about 7 to 11 parts of zinc 2-ethyl hexonate must be used for 100 parts of total epoxy resin, whether the adhesive is to be used solely as such or also as the sole resinous insulation. The epoxy resin will not cure properly and will have high power factor values if under about 7 parts of zinc 2-ethyl hexonate is used. The epoxy resin will not have a long shelf life if over about 11 parts of zinc 2-ethyl hexonate is used.

When the epoxy adhesive is to be used solely as such, in an unimpregnated tape, the admixture of epoxy resin and zinc 2-ethyl hexonate may be simply cold blended at 25° C, with at least one suitable aromatic or aliphatic organic solvent, such as toluene, benzene, naphtha, xylene and the like, to form a solution containing between about 20 wt.% to 55 wt.% solids.

When the epoxy adhesive is to be used in a fully loaded preimpregnated tape, in the dual role of adhesive and sole resinous insulation, the mixture of epoxy resins and zinc 2-ethyl hexonate is first preheated while stirring for between about 2 to 8 hours at about 90° C up to 140° C. The resin is thus advanced, or partly reacted. This preheating is for a time effective to allow a small effective amount of lower epoxy equivalent weight epoxy to combine with the higher epoxy equivalent weight in order to help eliminate tackiness and stiffness in the tape at high loadings. It must also remain soluble in a suitable solvent. The heated, partly reacted resin admixture is then blended with a suitable solvent, such as those described hereinabove, to form a solution containing between about 20 wt.% to 55 wt.% solids, and then cooled to 25° C before impregnation into the tape.

The resinous epoxy-zinc 2-ethyl hexonate solution is applied to the surface of the mica tape by any suitable means, such as dipping, spraying, brushing, etc. The coated mica tape is then generally dried in an oven at a temperature of between about 120° C to 140° C for a time effective to flash off and remove substantially all of the solvent, generally about 2 to 5 minutes. The impregnated mica tape can then be rolled onto a reel for storage, and later, applied to conductors such as electrical machine windings.

Referring now to FIG. 1 of the drawings, the mica tape containing the adhesive of this invention is shown as 12. The mica tape 12 for building coils in accordance with the present invention may be prepared from a porous sheet backing material 14 upon which is disposed a layer of mica flakes 16. The porous sheet backing and the mica flakes are impregnated with the liquid epoxy resin adhesive. The mica flakes can then be covered with another layer of porous sheet backing in order to protect the layer of mica flakes and to produce a more uniform insulation. This mica insulation is preferably in the form of a tape of the order of one inch in width, though tapes or sheet insulation of any other width may be prepared.

For building electrical machines, the sheet backing 14 for the tape may comprise paper, asbestos paper, cotton fabrics, glass cloth or glass fibers, or sheets or fabrics prepared from synthetic resins, such as nylon, polyethylene and linear polyethylene terephthalate resins. Sheet backing material of a thickness of approximately 1 to 3 mils, to which there has been applied a layer of from 3 to 10 mils thickness of mica flakes has been successfully employed.

While mica flake insulation is preferred for high voltage machines, other types of mica containing tape can be used for less rigorous applications. For example, mica paper, comprising small mica particles bound together in a paper making process can be used, with or without a backing, in place of the composite mica flake tape shown. This paper would similarly be treated with the liquid epoxy resin adhesive.

Figure 2:
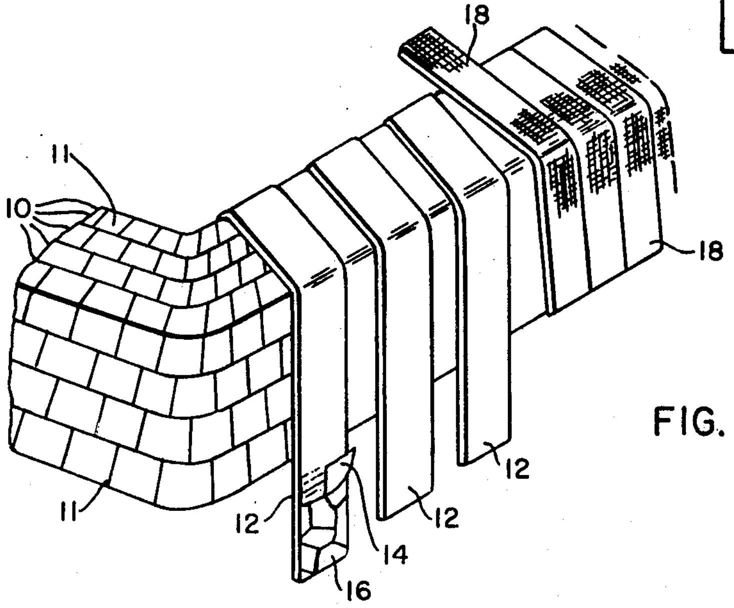
FIG. 2 is a fragmentary view in perspective, showing part of a high voltage coil comprising a plurality of turns of conductors wound with turn insulation and bound together with the mica tape of this invention as ground insulation, covered with a porous bonding tape.

In a high voltage A.C. motor, the coil member may comprise a plurality of turns of round or rectangular metallic, electrical conductors, each turn of the conductor consisting essentially of a copper or aluminum strap 10 wrapped with turn insulation 11, as shown in FIG. 2. The turn insulation 11 would be disposed between the conductor straps 10 and the mica tape 12, and would generally be prepared from a fibrous sheet or strip impregnated with a resinous insulation.

While the turn insulation may consist solely of a coating of uncured varnish or resin, it can also comprise a wrapping of fibrous material treated with a cured resin. Glass fiber cloth, paper asbestos cloth, asbestos paper or mica paper treated with a cured resin may be used with equally satisfactory results. The resin applied to the turn insulations may be a phenolic resin, an alkyd resin, a melamine resin or the like, or mixtures of any two or more of these.

The turn insulation is generally not adequate to withstand the severe voltage gradients that will be present between the conductor and ground when the coil is installed in a high voltage A.C. motor or generator. Therefore, ground insulation for the coil is provided by the mica tape 12 of this invention, which binds the entire coil of electrical conductors together. Preferably, a plurality of layers of the composite mica tape 12 are wrapped about the coil to bind the electrical conductors together, with sixteen or more layers being used for high voltage coils of generators.

A bonding tape 18, which is porous and preferably semiconducting, may be wound around the mica tape bound coil. The bonding tape may comprise a porous, open weave substrate of natural or synthetic fabric cloth, for example, cotton, polyethylene or polyethylene terephthalate, coated with a phenolic type resin containing electrically conducting filler particles such as carbon.

Figure 3:
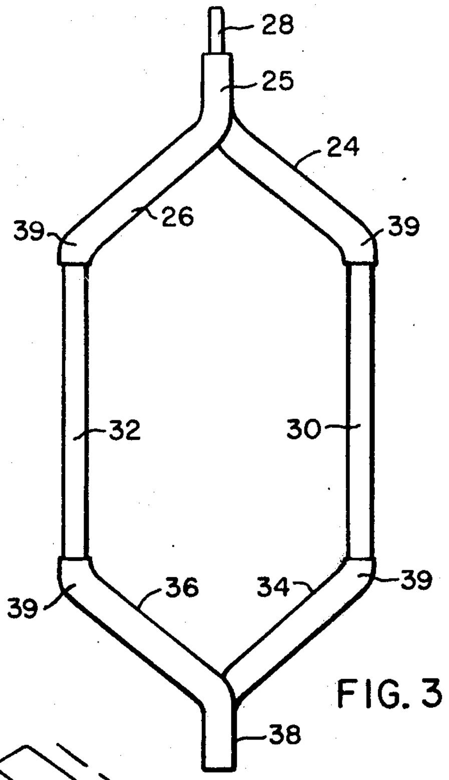
FIG. 3 is a plan view of a full coil constructed according to this invention.

A closed full coil is illustrated in FIG. 3. The full coil has an end portion comprising a tangent 24, a connecting loop 25 and another tangent 26, with bare leads 28 extending therefrom. Slot portion 30 and 32 of the coil are formed to a predetermined shape and size. The slot portions are connected to the tangents 24 and 26 respectively. These slot portions are connected to other tangents 34 and 36 connected through another loop 38. The mica tape of this invention can be used to insulate this type of coil.

When the coils are wrapped with a mica tape containing about 20 to 35 wt.% of the preimpregnation epoxy mixture of this invention, they may be inserted into an electrical machine and cured in situ without a subsequent impregnation step.

When the coils are wrapped with an unimpregnated mica tape, containing only about 3 wt.% to 15 wt.% of the adhesive epoxy mixture of this invention, they are inserted into the electrical machine, and in a subsequent step the electrical machine containing the coils is immersed in a suitable insulating resin, for example a solventless polyester, epoxy or epoxy-styrene composition. Then, the coils are vacuum impregnated under pressure. After this step the machine is removed from the impregnating tank, drained, and subjected to a heating step to cure the adhesive and insulating resins in the coils.

EXAMPLE 1

A fully loaded preimpregnated tape was made. The catalyzed epoxy preimpregnation composition was made by admixing: 45 parts by weight of a liquid diglycidyl ether of bisphenol A having a viscosity of 10,000 to 16,000 cps at 25° C and an Epoxy Equivalent Weight of between 185 to 192 (sold commercially by Shell Chemical Co. under the tradename Epon 828); 45 parts by weight of a viscous diglycidyl ether of bisphenol A having a Durrans melting point of 35° C to 40° C and an Epoxy Equivalent Weight of between 230 to 280 (sold commercially by Shell Chemical Co. under the tradename Epon 834) and 7.8 parts of zinc 2-ethyl hexonate prepared as described hereinabove. This provided an admixture with a 1:1 weight ratio of two epoxy resins and containing 8.7 parts of zinc 2-ethyl hexonate per 100 parts of total epoxy resin. The zinc content was about 1.6% by weight of the epoxy resin.

The mixture was heated with stirring for 1 hour at 100° C and about 3 hours at 135° C. At this point the heated preimpregnation composition was now partly reacted to a "pill" stage, i.e. a cooled drop of the resin could be rolled between the fingers without sticking. The resinous admixture was then dissolved in about 200 parts by weight of toluene solvent and cooled to 25° C, to provide a solution of about 33 wt.% solids. The preimpregnation composition was tack free but still readily soluble in toluene.

This cooled, preheated catalyzed epoxy preimpregnation composition was then heavily brushed onto glass cloth backed amber mica paper. The solvent was flashed off in an oven at about 135° C for about 4 minutes, to remove substantially all of the toluene. The epoxy impregnated mica tape contained about 35 wt.% of the catalyzed epoxy composition.

The preimpregnated tape was soft, pliable, well bound together and about 10 mils thick. The preimpregnated tape adhered to itself yet had no surface tackiness. It could be wound on a reel without blocking, and could be unwound with ease even after storage at 25° C for about 4 months.

Three plies of the fully loaded mica paper were laminated by pressing them together for 1 hour at 175° C and 20 psi. This provided a compressed sample about 25 mils thick. The sample was strong and translucent, and had the following electrical properties:

TABLE 1

| | 100° C | 120° C | 150° C |
|---|---|---|---|
| power factor (60 Hz) 100 × tanδ | 2.3% | 5.1% | 14.0% |
| dielectric constant ε | 6.2 | 6.0 | 5.9 |

For high voltage usage, on 25 mil samples, power factors below about 20% at 150° C are considered acceptable. These values would indicate that this mica tape preimpregnated would provide excellent insulation for conductors and coils in high voltage electrical apparatus.

The experiment was repeated as described above except that the heating was continued up to 5 hours at 135° C. At this time the heated partly reacted preimpregnation composition was very viscous and beginning to climb the stirring rod. The resin, however, was completely soluble in toluene and provided a preimpregnated tape and laminate having similar physical and electrical properties to the tape and laminate described above.

EXAMPLE 2

The experiment was repeated as described in EXAMPLE 1, with a cooking time of 3 hours, except that 90 parts by weight of Epon 828, having an Epoxy Equivalent Weight of between 185 to 192, was used as the sole epoxy resin i.e. a dual epoxy resin system was not used. After impregnation and solvent flash off, the glass cloth backed amber mica paper was loaded with 35 wt.% of the catalyzed epoxy composition. The preimpregnated tape however was extremely tacky, and would block when wound on a reel.

EXAMPLE 3

The experiment was repeated as described in EXAMPLE 1, with a cooking time of 3 hours, except that 90 parts by weight of Epon 834, having an Epoxy Equivalent Weight of between 230 to 280 was used as the sole epoxy resin i.e. a dual epoxy resin system was not used. After impregnation and solvent flash off, the glass cloth backed mica paper was loaded with 35 wt.% of the catalyzed epoxy composition. The preimpregnated tape was tack free, it was however very stiff and could not be wound around a conductor. Comparative EXAMPLES 2 and 3 indicate the necessity of a preheated dual epoxy resin system with each epoxy resin having a particular Epoxy Equivalent Weight, when the mica tape is to be used as a highly loaded prepreg, i.e. and tape containing about 20 wt.% to 35 wt.% of resinous adhesive.

EXAMPLE 4

An unimpregnated adhesive bound tape was made. The catalyzed adhesive composition was made by admixing at 25° C: 100 parts by weight of a viscous diglycidyl ether of bisphenol A having a Durrans melting point of 35° C to 40° C and an Epoxy Equivalent Weight of between 230 to 280 (Epon 834) and 8.74 parts by weight of zinc 2-ethyl hexonate prepared as described hereinabove.

The admixture was then dissolved in about 163 parts by weight of toluene to provide a viscous solution of about 40 wt.% solids.

This catalyzed epoxy adhesive composition was then lightly brushed onto a tape of small mica flakes on a polyethylene terephthalate (Dacron) backing. The solvent was flashed off in an oven at about 135° C for about 4 minutes to remove substantially all of the toluene. The epoxy coated mica tape contained about 5 wt.% of the catalyzed epoxy adhesive.

The mica tape was pliable, well bound together and about 10 mils thick. The mica tape could be handled easily and wound around conductors without coming apart. The mica tape had no surface tackiness. It was very flexible, could be wound on a reel without blocking and could be unwound with ease even after storage at 25° C for about 4 months.

About 12 plies of the catalyzed, epoxide adhesive, bound mica tape wound, half-lapped around copper test bars. The mica tape wound test bars were then impregnated with a solventless, anhydride catalyzed, epoxy-styrene impregnating varnish, containing about 2 parts styrene per part epoxy. The test bars, with about ⅛" mica tape insulation, were then baked in an oven for 7½ hours at 160° C. These samples had the following electrical properties:

TABLE 2

| | 25° C | 150° C |
|---|---|---|
| power factor (60 Hz) 100 × tanδ | 1.58% | 2.31% |

For high voltage usage, on these type samples, power factors below 10% at 150° C are considered excellent. Cut sections of the insulation had tensile strength values of 11,000 psi at 25° C, indicating extremely good tape bonding.

EXAMPLE 5

Two adhesive compositions were made by admixing at 25° C: 100 parts by weight of a viscous diglycidyl ether of bisphenol A having a Durrans melting point of 35° C to 40° C and an Epoxy Equivalent Weight of between 230 to 280 (Epon 834) with: (1) 8.74 parts by weight of zinc 2-ethyl hexonate and (2) 22 parts of zinc resinate. Both zinc compounds were compatible with the epoxy resins, providing a clear solution. In each case the zinc content was about 1.6% by weight of the epoxy resin. Samples of each were placed in laboratory flasks and aged at 25° C and 50° C. Only the zinc 2-ethyl hexonate gave adequate shelf life to be considered useful as a latent catalyzed adhesive in commercial winding tapes, i.e. it remained unreacted and did not begin to gel at 25° C, as evidenced by the results below:

TABLE 3

| | 25° C | 50° C |
|---|---|---|
| Epoxide + zinc 2-ethyl hexonate | 129 days fluid | 129 days fluid |
| Epoxide + zinc resinate | 49 days semi-solid gel | 49 days hard mass |

The zinc 2-ethyl hexonate catalyzed epoxy compositions of this invention should provide coated or impregnated mica tape with a shelf life of at least 5 to 6 months at room temperature, withstand coil drying if necessary at about 110° C, yet completely cure to a thermoset state at final bake temperatures of about 140° C to 225° C.

Other zinc compounds, such as zinc octoate, zinc linoleate, zinc oleate, zinc laurate and zinc palmitate were mixed with Epon 834 epoxy resins and toluene, and none of these were compatible with the epoxy resin even after 16 hours stirring. Of all the zinc compounds tried, only the zinc 2-ethyl hexonate compatible with the epoxy resin and also evidenced any latent catalytic effect to provide commercially useful shelf life values. Thus it would appear that the zinc 2-ethyl hexonate is critical in providing useful combination electrical and storage stability properties for mica tape coil binding insulation.

I claim:

1. A flexible, non-tacky, fully loaded, preimpregnated tape, for electrical conductors used in high voltage devices, comprises at least one layer of a micaceous material impregnated with about 20 to 35 wt.% of a resinous admixture, capable of forming an infusible thermoset insulation consisting essentially of: (1) 45 to 55 parts by weight of an epoxy resin having an epoxy equivalent weight of between about 170 to 210; (2) 45 to 55 parts by weight of an epoxy resin having an epoxy equivalent weight of between about 215 to 300 and (3) about 7 to 11 parts of zinc 2-ethyl hexonate as a latent catalyst per 100 parts of total epoxy resin; said admixture preheated up to 140° C before impregnation.

2. The tape of claim 1, wherein the epoxy resins are diglycidyl ethers of bisphenol A acting as sole insulating resin in the tape, the admixture is preheated between about 90° C and 140° C before impregnation, and the micaceous material is supported by a pliable fibrous sheet backing.

3. The tape of claim 2, wherein the sheet backing is selected from the group consisting of paper, asbestos paper, cotton fabric, glass cloth, glass fibers, nylon fabric, polyethylene fabric, and polyethylene terephthalate fabric; the micaceous material is selected from the group consisting of mica paper and mica flakes and the tape has shelf life of at least about 3 months at 25° C.

4. A high voltage electrical coil, comprising plurality of metallic electrical conductors bound together by at least one winding of the tape of claim 2.

5. The electrical coil of claim 4, wherein the resinous admixture in the tape is cured to a thermoset state.

6. A flexible, non-tacky tape, for electrical conductors used in high voltage devices, comprises at least one layer of a micaceous material impregnated with about 3 to 15 wt.% of a resinous admixture consisting essentially of: (1) an epoxy resin having an epoxy equivalent weight of between about 215 to 300 and (2) about 7 to 11 parts of zinc 2-ethyl hexonate as a latent catalyst per 100 parts of epoxy resin.

7. The tape of claim 6, wherein the epoxy resin is a diglycidyl ether of bisphenol A acting as adhesive binder and the micaceous material is supported-by a pliable fibrous sheet backing.

8. The tape of claim 7, wherein the sheet backing is selected from the group consisting of paper, asbestos paper, cotton fabric, glass cloth, glass fibers, nylon fabric, polyethylene fabric, and polyethylene terephthalate fabric; the micaceous material is selected from the group consisting of mica paper and mica flakes and the tape has a shelf life of at least about 3 months at 25° C.

9. A high voltage electrical coil, comprising a plurality of metallic electrical conductors bound together by at least one winding of tape of claim 7.

10. The electrical coil of claim 9, wherein the tape is impregnated with an insulating varnish and both the resinous admixture and the insulating varnish in the tape are cured to a thermoset state.

* * * * *